United States Patent [19]

Groves

[11] Patent Number: 5,110,661
[45] Date of Patent: May 5, 1992

[54] ARMOR COMPONENT

[75] Inventor: Trevor K. Groves, Calgary, Canada

[73] Assignee: Dorothy Groves, Calgary, Canada

[21] Appl. No.: 136,443

[22] Filed: Dec. 17, 1987

Related U.S. Application Data

[63] Continuation-in-part of Ser. No. 861,812, May 12, 1986, abandoned.

[30] Foreign Application Priority Data

Jul. 2, 1985 [CA] Canada.................................. 486220

[51] Int. Cl.⁵ ........................ F41H 1/02; F41H 5/04; F41H 5/06
[52] U.S. Cl. ...................................... 428/178; 2/2.5; 89/36.02; 89/36.05; 428/911
[58] Field of Search ............... 428/911, 323, 51, 325, 428/178; 2/2.5; 89/36.02, 36.05; 109/49.5, 78

[56] References Cited

U.S. PATENT DOCUMENTS

| | | | |
|---|---|---|---|
| 2,768,919 | 10/1956 | Bjorksten | 428/911 X |
| 3,523,057 | 8/1970 | Bock | 428/911 X |
| 3,577,836 | 5/1971 | Tamura | 428/911 X |
| 3,601,935 | 9/1971 | Cadwell | 428/911 X |
| 3,649,926 | 3/1972 | Gates | 428/911 X |
| 3,705,558 | 12/1972 | McDougal et al. | 109/84 |
| 4,029,838 | 6/1977 | Chamis et al. | 428/301 |
| 4,186,648 | 2/1980 | Clausen et al. | 428/911 X |
| 4,287,607 | 9/1981 | Leach | 2/2.5 |
| 4,608,717 | 9/1986 | Dunbavand | 2/2.5 |

FOREIGN PATENT DOCUMENTS

| | | |
|---|---|---|
| 101437 | 9/1897 | Fed. Rep. of Germany . |
| 816814 | 8/1937 | France . |
| 1119291 | 6/1956 | France . |
| 2442423 | 6/1980 | France . |
| 8303298 | 9/1983 | PCT Int'l Appl. ............. 2/2.5 |
| 1556245 | 11/1979 | United Kingdom . |
| 1577012 | 10/1980 | United Kingdom . |

Primary Examiner—George F. Lesmes
Assistant Examiner—Christopher Brown
Attorney, Agent, or Firm—Jim Zegeer

[57] ABSTRACT

An armor component for protecting a body from a high speed projectile, such as a bullet from a handgun or a rifle, and which is capable of flattening and trapping. The armor may include in combination with the component, which serves as an outer component, an inner component used in a garment or similar article, for spreading the impact of the bullet striking the outer component. The outer component, which is designed for flattening and trapping a bullet, may include a pair of layers of flexible material at least the inner layer of which it high impact-resistant material, and has at least two juxtaposed layers of hard beads between the flexible layers. The beads in the adjacent layers are disposed with beads thereof inter-nested in the inter-bead spaces of each other. The volume occupied by the layers of beads is preferably substantially void of all other material. The beads of each layer may be arranged in a regular close-packed lattice pattern, i.e., a hexagonal or square so that each bead contacts its immediately adjacent neighbor beads. A garment using an outer part of this type is light and flexible but is capable of trapping the bullet with little risk of spalling of the parts of the component.

8 Claims, 3 Drawing Sheets

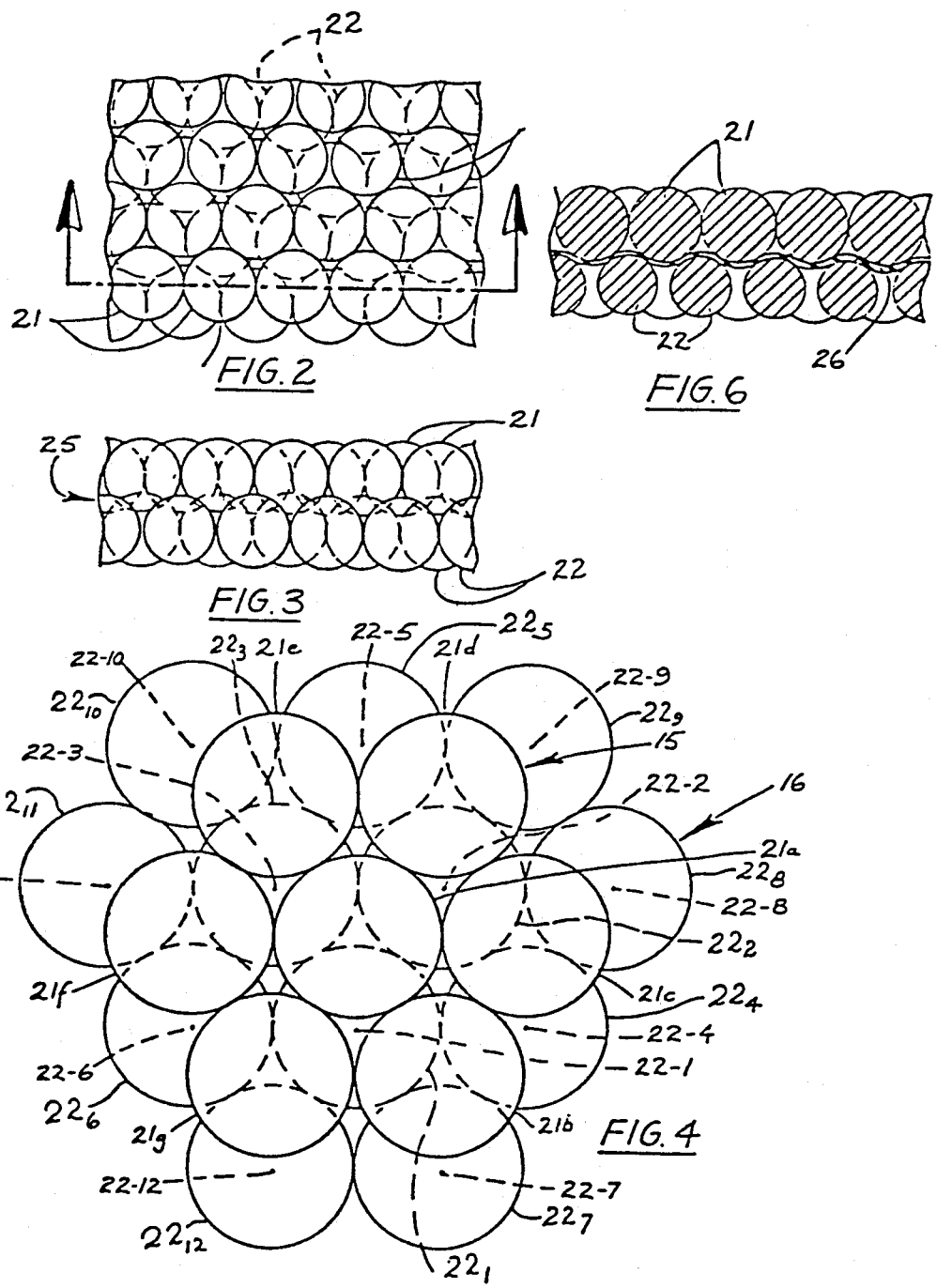

ARMOR COMPONENT

RELATED APPLICATION

This is a continuation-in-part of my co-pending U.S. patent application Ser. No. 861,812, filed May 12, 1986, and entitled "Armour Component", now abandoned.

BACKGROUND OF THE INVENTION

This invention relates to an armour component for protecting a body from a high speed projectile such as a bullet from a handgun or rifle.

Armour must be capable of stopping passage of bullets of a variety of sizes and speeds, and when used in body armour, it must also reduce the damage caused by the impact resulting from the bullet being trapped within the armour. Moreover, to be acceptable as body armour, it must be flexible without gaps and of light weight.

In a commonly used type of body armour, the material used in an outer bullet-trap essentially consists of an array of multi-layered flexible slabs or platelets formed of hard material and joined by tough flexible cloth so as to provide a discontinuously flexible garment. Such body armour has the advantage of the immediate post-impact velocity of the platelet containing the bullet being predictable for a chosen platelet mass and an anticipated bullet threat because the collision of the bullet with a platelet is inelastic. On collision of the bullet with the platelet, the velocity of the platelet relative to the bullet velocity is simply proportional to the ratio of the bullet mass (m) to the post-collision mass of the platelet (M) plus the bullet mass, i.e., (M+m). It is apparent, therefore, that for a particular bullet threat that the post-collision velocity of the platelet, i.e., the maximum possible platelet velocity just before its collision with a backing component of the garment must be preset at an acceptable level, and this is done by choosing a sufficiently large platelet. In summary, in the platelet type of body armour, the trap portion of the device converts the penetration threat of a high-velocity, low-mass, small-diameter soft bullet into the bruising impact threat of a low-velocity, high-mass, large diameter hard-fronted rigid body. A pronounced rigid bulge occurs on the inner surface of the impacted platelet arising from it being hit with the bullet and its effect on any backing component of the garment is equivalent to a vigorous blow from a large hammer. It appears that known backing components are not capable of dealing with such a blow without the wearer suffering from bad bruising or bone fracture. Moreover, because flexibility is imperative, the closeness of the platelets is limited, and in sharply curved areas of the body, gaps between adjacent platelets may be sufficiently large to allow bullet penetration. Additionally, the required rigidity of each individual platelet can result in spalling, that is the breaking of the platelet into massive, hard, jagged fragments which may penetrate the inner component because the velocity of the spall may approach that of the striking bullet.

The use of hard spheres has been suggested in the prior art. Canadian patent No. 797,509, Oct. 29, 1968, to King, shows hard spheres embedded in rigid plastic plates. U.S. Pat. No. 4,186,643, Feb. 5, 1980, to Clausen, also discloses a flat panel laminate and refers to the use of glass beads which are fixed in place for effectively abrading a projectile. In U.S. Pat. No. 3,324,768, Jun. 13, 1967, to Eichelberger, there are shown rigid panels of hard plates having a layer of glass balls or marbles. U.S. Pat. No. 4,179,979, Dec. 25, 1979, discloses hard spheres supported by material of high tensile strength with the spheres being restrained in place by a material such as foam or a suitable resin intermixture. In U.S. Pat. No. 3,705,558, issued Dec. 12, 1972, to McDougal et al, there is also shown an armour in which hard spheres are encased in a metal container which has a backing of a relatively inflexible material, such as aluminum. As will be explained in more detail below, these type of armour structures do not provide the same energy dissipating characteristics of the structure of the present invention.

SUMMARY OF THE INVENTION

Contrary to the arrangements shown in the prior art, the present invention provides for an armour component which is completely flexible and utilizes a feature of the glass beads encountering unimpeded multiple impacts with each other and the bullet to accomplish bullet distortion and energy degradation.

According to one aspect of the present invention, there is provided an armour component which includes two layers of flexible material with at least two layers of beads tightly confined therebetween, the beads in one layer being disposed in most compact relation with the beads of an immediately adjacent layer so that the beads of the adjacent layers internest in the inter-bead spaces of each other. The volume occupied by the layers of beads is substantially void of all other material.

In the specific embodiment of the invention described herein, the two juxtaposed layers are hard beads disposed in a regular close-packed lattice pattern so that each bead contacts each immediate neighbour bead in the pattern.

BRIEF DESCRIPTION OF THE DRAWINGS

In the accompanying drawings, which illustrate embodiments of the invention, as examples.

FIG. 2 is a plan view of the two layers of beads of the outer component of FIG. 1;

FIG. 3 is a side view of the beads shown in FIG. 2;

FIG. 4 is a plan view of the two layers of beads as shown in FIG. 2 but even further enlarged;

FIG. 6 is a cross sectional view as seen from the line 6—6 of FIG. 2 and shows two layers of beads of the outer component of another alternative embodiment;

DESCRIPTION OF PREFERRED EMBODIMENTS

Figure 1:
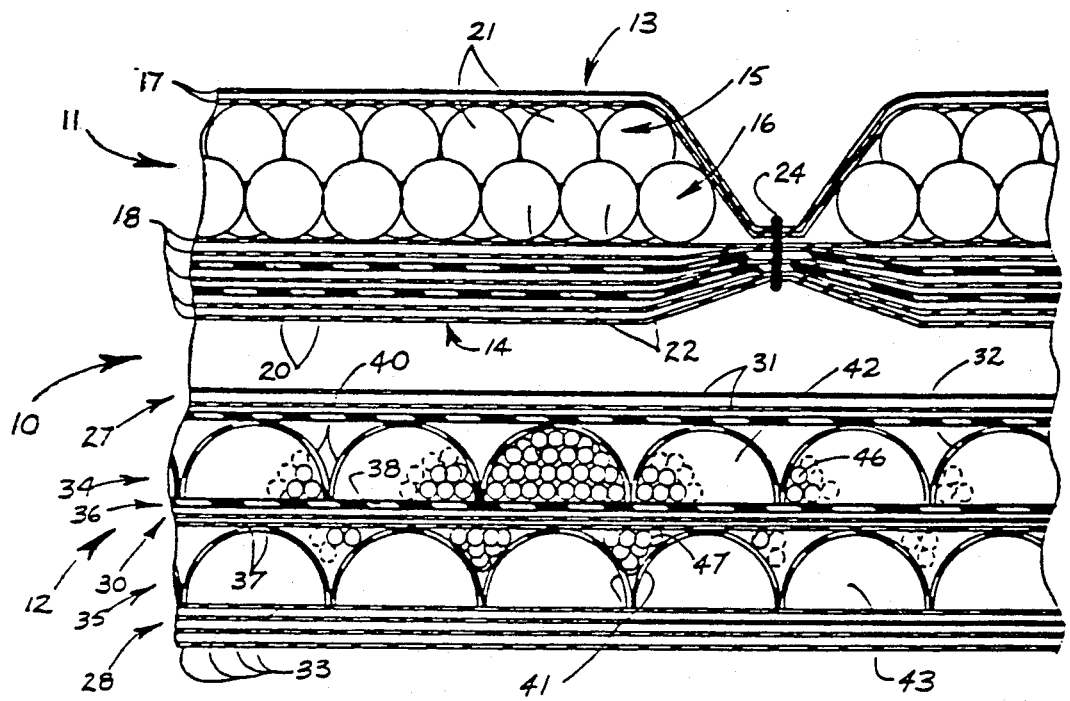
FIG. 1 is a cross section on an enlarged scale through a garment having an outer component according to the present invention and in combination with an inner component.

In FIG. 1, the reference number 10 generally denotes the wall of a garment formed by an outer component 11 of the present invention in combination with an inner component 12. It should be understood that the outer component 11, which forms the bullet trap may be used separate from the particular disclosed inner component and may be designed on any scale of size for use in protecting various things, such as motor vehicles, ships, aircraft, buildings, etc., but it will become apparent from the description of the manner in which the outer component functions, the effectiveness of the outer component is enhanced when used in conjunction with an inner component, and further, it is important that in use, the outer component is not located flat against a hard surface or the body it is protecting.

The embodiment of the outer component of the invention shown in FIG. 1 to 4 includes inner and outer flexible layers 13 and 14 with two layers of beads 15 and 16 tightly confined therebetween. The outer layer 13 includes a sheet of high impact-resistant material, and in the particular embodiment illustrated, it includes at least two such sheets 17, which may be a cloth of woven aramid fibers, such as that sold under the trade mark KEVLAR. The inner layer 14 may also consist of a number of sheets, at least one of which has flexible, tough and elastic characteristics. The inner layer 14 is shown as including a plurality of high impact-resistant sheets 18, such as KEVLAR cloth, with two sheets 20 of the flexible, tough and elastic material, which may be a foil sold under the trade mark LEXAN, the foil sheets 20 being interleaved between the sheets 18 of high impact-resistant material. Although the sheets making up the outer and inner flexible layers are shown as being slightly separated for the sake of clarity, it should be appreciated that they would normally be in intimate contact throughout.

Although two layers 15 and 16 of beads are shown, more layers may be utilized. It is believed, however, that better results are obtainable by utilizing an even number of layers, and it would seem that when using two layers, a simpler approach may be taken in ensuring that the beads are retained in a preselected pattern. The upper or outer layer 15 consists of a plurality of hard spherical members 21, which may be formed of glass. The spheres or beads 21 are shown as being of uniform diameter arranged in a regular close-packed lattice pattern. The two alternative close-packed patterns available are a square and a triangle, these being patterns wherein each bead is in contact with all of its immediate neighbour beads. As is most apparent from FIG. 4, the triangular pattern results in a centre bead of a selected cluster being in contact with six surrounding beads and, accordingly, throughout this description reference will be made to a hexagonal pattern instead of a triangular pattern. It is believed, for reasons which will become apparent below that a regular pattern, and likely a hexagonal regular lattice pattern, will provide optimum results. Although it is important that the volume occupied by the layer 15 be substantially void of all other material, it is possible to provide beads of a smaller diameter in the interstices of the main beads of the two layers as long as the close-packed pattern of the main beads is not disrupted. Beads 22 which form the inner layer 16 are shown as being of the same diameter and having the same close-packed lattice pattern as the outer layer 15, and the two layers 15 and 16 are disposed in a most compact relation with the beads of the two layers internesting in the inter-bead spaces of each other. This internesting relationship of the two layers is most apparent in the area 25 shown in FIG. 3. Looking at FIG. 2, it can be seen that the placement of the patterns of the two layers are staggered to accomplish the most compact relation of the two layers, i.e., the beads of the two layers are not aligned as viewed from the top in FIG. 2. As in the case of the beads of the outer layer 15, there is nothing in the bead interstices, so that in the embodiment shown, the entire volume occupied by the two bead layers 15 and 16 is completely void of any other material.

In forming the outer component 11, the beads are confined tightly between the outer flexible layers 13 and 14 by the flexible layers being tightly stitched together, such as by the stitching shown at seam 24, and in this type of the fastening of the layers together, it would be desirable to utilize two of the outer components 11 with the seams staggered so as not to leave any lines which would not provide a bullet trap. Alternatively, the component 11 could be formed in narrow strips which are then formed into a continuous outer body by joining the strips in a woven fashion.

Figure 5:
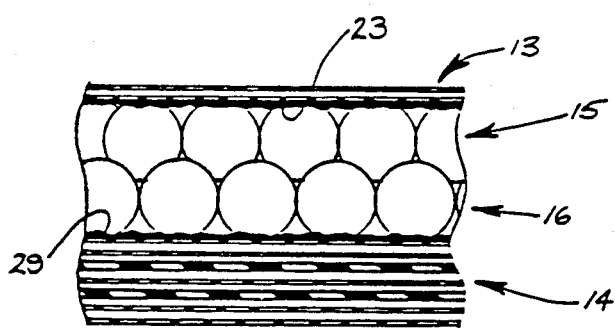
FIG. 5, which appears on the same sheet as FIG. 1, is a cross section through the outer component and showing an alternative embodiment.

FIG. 5 illustrates another alternative embodiment in which a thin layer of adhesive 25 is provided between the outer layer of beads 15 and the adjacent outer flexible layer 13. If the outer flexible layers 13 and 14 are otherwise tightly drawn toward each other by stitching (not shown in FIG. 5) the interengagement between the beads of the two layers 15 and 16 would also maintain the beads 16 of the inner layer in their predetermined pattern as well, or as is shown, a layer of adhesive 29 could also be used between the inner layer 16 of beads and the adjacent inner flexible layer 14. Yet another method of ensuring that the beads remain in a preselected close-packed pattern would be that of threading the beads in each layer together and possibly using the same thread to attach the layer to its adjacent flexible layer. In any event it will become apparent from the description of the movement of the beads when struck by a bullet, it is desirable to have the volume occupied by the beads as free as possible of other material and to leave the beads substantially unhindered from movement when struck. Although it appears that best results are obtained when the beads are in a close-packed lattice pattern when struck, it is believed that some random arrangement will not necessarily defeat the bullet trapping ability which will be described in more detail below.

FIG. 6 illustrates an alternative design in which the volumes occupied by each of the layers 15 and 16 of the beads are void, but a thin barrier 26 is provided between the layers 15 and 16. The barrier 26 is a thin flexible sheet of high impactresistant material, such as KEVLAR, and although the presence of this barrier provides advantages under certain conditions, it may also have some minor deleterious affects in the desired movement of the beads.

In the above described embodiments, there is illustrated one arrangement wherein the beads of the two layers are in direct contact, see FIGS. 1 to 5, and another arrangement wherein a flexible barrier 26 is disposed between the two layers, see FIG. 6, but in both arrangements the inter-bead interstices are, in the main, void of any matrix capable of significantly restricting the freedom of movement of the beads. As indicated the existence of the barrier may somewhat modify the characteristic of the outer component, making it less effective under some conditions but superior under other conditions. In yet another embodiment of the present invention, which will be described in more detail below, it is possible to provide a more practical manufacturing method and produce a structure capable of maintaining the integrity of the bead pattern during use and even after the armour has been struck a number of times such as by the fire of an automatic weapon.

Figure 7:
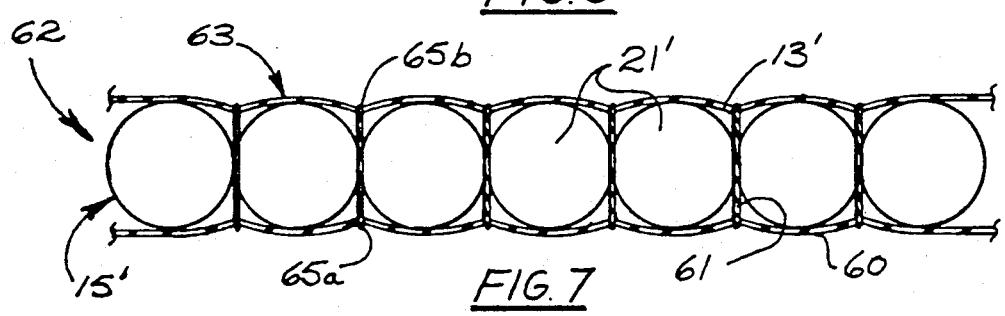
FIG. 7 is a cross-sectional view through a single layer of beads as enclosed in a separate envelope of a different embodiment of the invention.

In the embodiment of the invention shown in FIG. 7 the outer component of the armour is formed by making at least two separate parts, one of which is shown at 62, and then fastening the parts together. The part 62 includes a separate envelope 63 containing a single layer 15' of beads 21' confined between layers of flexible material 13' and 60. The layer of flexible material 13' may be of tough high impact-resistant material such as outer layer 13 of the previous embodiment. The other layer 60 forming the other confining layer of the envelope 63, which forms an interior layer of the overall outermost component, may be of the same material as layer 13', or it may be of a material having different characteristics, such as being less strong and less expensive. The envelope tightly confines the layer 15' of beads therebetween by means drawing layers 13' and 60 together, the means being in the form of a tough thread 61 which is sewn between layers 13' and 60 and passing through the inter-bead spaces 64 of the layer 15'. Even before the thread 61 is sewn into the envelope, the beads may be tightly confined because the envelope is initially formed by placing the beads in their appropriate pattern on one of the layers 13' or 60 and then placing the other layer on top of the beads and tightly tensioning it in both directions over the beads prior to sewing the two layer 13' and 60 together around the outer edges of the beads. In making the separate envelopes, the thread is pulled sufficiently tight, that crimping of the inner flexible layer 60 occurs as at 65a. Crimping may also occur as at 65b in outer layer 13'.

To form an outer component of an armour, such as component 11 of the earlier embodiment, two of the separate envelopes, which may of identical structure can be sewn back-to-back, i.e., with the inner layers 60 in engagement. Thus the outer layer 13', which is preferrably of high impact-resistant material, of the second envelope becomes the inner layer of the outer component corresponding to inner layer 14 of the earlier embodiment. Alternatively, the two separate envelopes could be of different construction with the outer layers 13' thereof of different material, if, for example, it is desired to have the inner flexible layer of the outer component of the armour of a different character than the outer flexible layer.

As previously described, the beads 21' in each layer are in a close packed lattice pattern, and the arrangement in the different envelopes is the same so that when the inner layers 60 of the envelopes are brought together, internesting of the beads can occur, i.e., the high spot caused by a bead in the flexible layer of 60 of one envelope fits into the indented or crimped area of the flexible layer 13' of the other envelope. When so oriented, some of the inter-bead spaces in the two layers of beads align, as at 67. The component is then sewn with a thread 68, which passes through what then forms the outer layers, through the engaged inner layers 60 and through the inter-bead spaces 67.

Figure 8:
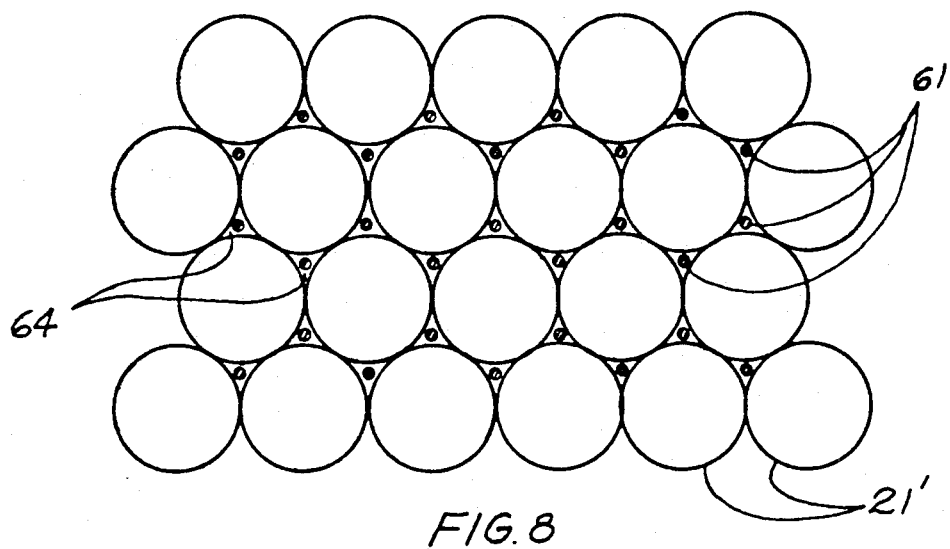
FIG. 8 is a plan view of a layer of beads of the embodiment of FIG. 7 showing the location of stiches crimping the layers of the flexible layers of the separate envelope.

As can be seen for the pattern of beads illustrated in FIG. 8, there is established for each separate envelope a strong network of thread under tension which separately maintains the integrity of the pattern of the layer of beads in that envelope. The thread extends between the two layers of flexible material at right angles relative to the material. In the hexagonal pattern shown, each bead is constrained in its position in the pattern of its own layer by six threads. When the two separate envelopes are then sewn together, three additional threads, which pass through all four layers of flexible material, also constrain each bead (see FIG. 9).

Figure 9:
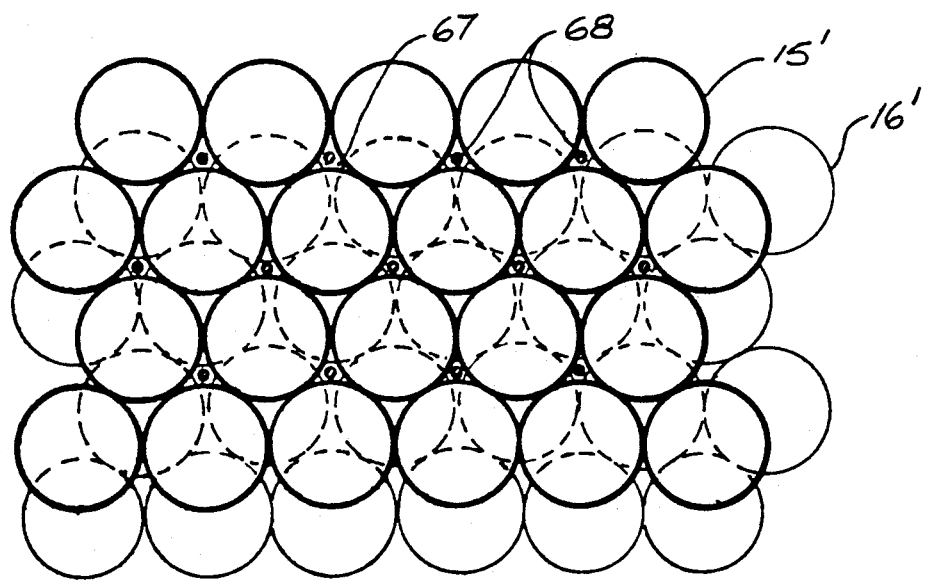
FIG. 9 is a plan view showing the relative positioning of the beads in the two layers of beads in a component formed by fastening together two of the separate envelopes of FIG. 7.

Because the beads in the two layers of the finished component may possibly be more restricted in their relative movement, the embodiment of FIGS. 7 to 9 may be capable of dissipating less energy than the embodiment of FIGS. 1 to 5, but it appears that the negative effect of the threads is small because the restraint caused by the thread is small in relation to the forces encountered at the point of contact by a bullet. Although the embodiment shown in FIGS. 7 to 9 may have a slightly less ability to flatten the bullet and absorb its energy, the existence of the additional inner layers of flexible material enhances the bullet trapping characteristics of the component. Also, the arrangement has considerable advantage in manufacturing as the individual envelopes can be produced relatively easily as compared to attempting to confine two layers of beads together within a single enclosure. The individual envelopes with the single layer can be readily handled until brought together, and the mating of the two envelopes for the proper internesting has proven to be straight forward. Once the two envelopes are sewn together, the beads in each layer, and the two layers of beads maintain their proper relationship through extended use, and as previously described, the armour of this embodiment has tested well in a situation where the armour is struck by several bullets very close together. Moreover the component formed in the manner just described also demonstrates considerable flexibility overall for enhanced comfort and usefulness.

The selection of the size and material for the spheres or beads 21 and 22 will depend on the use of the component 11. It is believed that the optimum diameter of the bead is approximately $\frac{1}{8}$ to $\frac{1}{2}$ the diameter of the bullet likely to be encountered. When the component is to form an outer garment of bullet-proof clothing, an optimum size appears to be about 3 to 5 mm. in diameter, a small glass bead of this size weighing about 0.036 to 0.17 grams. If, as previously suggested, small beads are provided in the interstices of the larger beads in the outer layer 15, the larger beads may be about 6 mm. in diameter with the smaller being about 3 mm. in diameter. Tests have shown that glass is a desirable material in that it eliminates any danger of spalling.

As previously indicated, if the above-described component is to be used in body armour, it is preferably used in combination with an inner component capable of spreading the impact of the bullet trapped in the outer component, but the inner and outer components 11 and 12 are separate, and in fact, may be provided in completely different garments so that under certain conditions they can be worn separately. Alternatively, it might be advisable to wear two of the garments containing the outer component 11 in a particular circumstance.

The separate inner component 12 is provided for spreading the impact of the bullet being trapped in the outer component 11, and it may include an outer flexible layer 27, an inner flexible layer 28 and at least one layer or core 30 of compressible material confined between layers 27 and 28. In the arrangement which is shown, the outer layer 27 of the inner component includes a plurality of sheets of material consisting of two outer layers 31 of flexible high impact-resistant material, such as KEVLARF cloth, and a liner of a resilient, tough plastic material, such as LEXAN foil 32. The inner layer 28 is also shown as consisting of a plurality of sheets of material, such as four sheets 33 of a high impact-resistant material, such as KEVLAR cloth. The compressible intermediate material or core 30 is shown as including in itself two layers 34 and 35 each of which includes a plurality of closely packed chambers or compartments. More specifically, there is provided an intermediate flexible layer 36 consisting of a couple of sheets 37 of high impact-resistant material, such as KEVLAR cloth with an outer liner 38 of a flexible, tough and elastic material, such as a LEXAN foil. In between the intermediate layer 36 and the outer layer 27 and in between the inner layer 28 and the intermediate layer 36 there are formed by separate sheets 40 and 41 of flexible, tough elastic material, such as LEXAN foil, a plurality of closely spaced domes 42 and 43, with the domes in the two separate layers being aligned. As shown, the domes 42 have their bases fixed to the intermediate layer 36 and their tops in contact with the outer layer 27 while the domes 43 have their domes 43 fixed to the inner layer 28 and their tops in contact with the intermediate layer 36. The domes of each layer provide one series of compartments while the interstices of the domes provide other confinements or chambers. The outer domes 42 contain a plurality of small particles 46, which are preferably very light, rigid, fracturable spheroidal beads, such as hollow plastic spheres. In the interstices of the inner layer of domes 43, a deformable filler, such as a plurality of fracturable hollow plastic beads, is also provided. As is apparent from FIG. 1 the permanently deformable material provided in the two layers of domes is staggered because the domes are aligned and the hollow plastic beads are located within the domes in one layer and between the domes in the other so that there are no gaps without the material capable of spreading the impact of a bullet being trapped in the outer component.

The function of the outer component of the present invention is entirely different than that of the platelet type now used in body armour in that the disclosed design is light and flexible, is capable of providing continuity of coverage and has no possibility of damage due to spall. The flexible nature of the lattice bead pattern which is void of any filler material in the bead interstices allows for comfortable molding to the contours of the body without leaving gaps. The spherical shape of the beads, together with the lattice geometry and the very small area of contact between the beads results in spall which is very small in size and which will normally be confined to the rear surface of the outer layer of spheres. The observed spall in testing indicates that the spall is usually in the form of a small quantity of powdered glass, somewhat finer than table salt, and all contained within the flexible cover layers of the outer component.

As was previously stated, the two components 11 and 12 are preferably housed in separate garments but both garments may be worn together to obtain protection against a bullet threat. The inner garment containing component 12 could be worn together to provide protection against bruising which could result from impact of massive, slow moving objects, such as clubs or rocks, and even against penetration by sharp or pointed objects, such as knives. When worn together, a garment, including one component 11 and one component 12, provides protection against a moderate threat such as handgun bullets, but the wearer could fortify against a higher bullet threat, such as from hard-nosed bullets or more massive, high velocity rifle bullets, by using a third garment similar containing a component such as component 11, but possibly using larger beads.

The continuous, flexible nature of the bead lattice tightly confined between the flexible layers for forming a bullet trap does not allow easy prediction of the collision velocity of the bullet-containing trap with the inner component 12. The analysis is complicated because of energy being dissipated through various modes of bead motion active throughout the period of time between bullet impact on the component 11 and the component 11 impact on the inner component 12. Tests have shown, however, that at the time of collision of the outer component 11 with the inner component 12, the slug is within the innermost flexible layer 14 of the component 11, and it is only this soft-fronted slug that presents any significant impression on the inner component 12. It is apparent that the outer component of the illustrated design converts the penetration threat of a high velocity, low mass, low-diameter bullet into a bruising impact threat of a moderate velocity, flexible bead-bag containing the bullet, now flattened to a moderate diameter, which bruising impact threat can be readily handled by the inner component 12.

When a close-packed, hexagonal pattern is used as shown in FIG. 4, and a bullet which has a diameter equal to about three of the beads makes a normal impact centered on bead 21a of the outer layer 15 of the beads, it is believed that in the collision seven of the beads in the outer layer 15 will become involved, namely bead 21a and its immediate neighbours, beads 21b, 21c, 21d, 21e, 21f and 21g. In this situation, the bullet strikes beads 21a–21g substantially simultaneously, thus initiating a strong compression wave in them while a compression wave of equal strength is reflected back to the bullet. If one considers the example where the bead diameter is 3 mm. and the bullet speed is 0.4 mm/$\mu$sec at impact with the wave front speeds in the lead bullet and in the glass spheres being taken to be roughly the sonic wave values, namely, 2.16 mm/$\mu$sec and 5.5 mm/$\mu$sec, respectively, it can be seen that in 0.55 $\mu$sec, the compression wave front arrives at the opposite boundary of beads 21a–21g. At that instant, every bead surface is unsupported or free so that a tensile wave is reflected back into each of the outer beads of the group, and in view of local geometry, some spalling may occur at that time. However, at the three points supporting each outer bead from the inner level beads, the wave is weaker, and if the bead layers are in direct contact, the compression wave is transmitted without change into the beads of the inner layer 16. The beads of the inner layer at this time experience strong rotational forces due to the offset nature of the impact leading to irreversible energy loss due to friction. About one microsecond after the initial bullet impact, the transmitted compression wave arrives simultaneously at the innermost points of the inner bead layer which points are depicted with reference characters 22-1, 22-2, 22-3, 22-4, 22-5, 22-6, 22-7, 22-7, 22-8, 22-9, 22-10, 22-11 and 22-12 in FIG. 4. The compression wave strength at these points at the inner surface of the beads of the inner layer, just before the wave is reflected, is in relative terms, three at points 22-1, 22-2 and 22-3, two at points 22-4, 22-5 and 22-6, and one at points 22-7, 22-8, 22-9, 22-10, 22-11 and 22-12 because the beads concerned are respectively in contact with three, two, one of the bullet-impacted beads of the outer layer 15. The compression waves arrive at the twelve points 22-1–22-12 simultaneously and constitute the first disturbance to arrive at the interface between beads and its inner flexible layer 14. The performance of the outer component 11 or bullet trap is now determined by the response to this disturbance of the material immediately backing the layers of beads. As was previously indicated, the proper function of component 11 depends on the inner layer 14 not being in direct engagement with a solid body.

Because the material of inner layer is composed of sheets which make it light, tough, flexible and extensible, the stress transmitted to it by way of the shock wave reaching points 22-1–22-12 transmits a moderate and tolerable stress to it. The compression waves encounter effectively a free surface at these points so that a tensile wave is reflected back towards the bullet and the material velocity behind this reflected wave front increases abruptly to nearly twice that of the incoming wave. When this reflected wave front reaches the interface between the two layers of beads, the twelve beads of the inner layer separate from the lattice pattern and move towards the inner flexible layer 14 at this enhanced velocity. With the hexagonal lattice pattern being considered, the 12 beads in the inner layer 16 are struck at about 35° off-normal and the resultant forces on the beads in the plane of the layer are equal in value for beads $22_1$ to $22_{12}$, while they are zero for beads $22_1$ to $22_3$, and these forces are entirely outward in directions 60 degrees apart. In view of the low mass and smooth sphericity of the beads and the moderate stress transmitted to the flexible inner layer 14, its penetration effect can be controlled. The collision of a bead with the inner layer results in some irreversible loss of energy in stretching of the materials in the inner layer together with rebound of the bead at a reduced speed. The superior impact speed of beads $22_1$–$22_3$, and, to some extent of beads $22_4$–$22_6$, tends to produce a concave shape in layer 14, this having the effect of focussing rebound of the other beads towards the impact zone. After rebound, the twelve beads of the inner layer 16 collide at high speed with the oncoming beads of the outer layer 15. In the event the bullet is of a very hard type, the impacted beads in the outer layer will have separated from the bullet after the passage through them of a tensile wave in the manner described above in respect of the beads of the inner layer. Thus, in this situation, the collision of the beads of the outer layer 15 with the rebounding beads of the inner layer 16 could be at a very high approach velocity, theoretically as high as twice the bullet impact velocity. However, the most common bullet, which would be encountered is a lead bullet, and in the case of this softer bullet, the hard beads or spheres in the outer layer 15 are likely to become embedded in the bullet at first impact. Thus, after the above described rebound of the twelve beads of the inner layer 16, the twelve beads impact with the encrusted array of hard beads fronting the bullet, and in this situation, the collision velocity is less than in the case of the harder bullet, but the collision velocity could still approach 1.5 times that of the original bullet speed.

In consequence of this collision, compression waves which are strong, localized and of short duration, about one microsecond, are transmitted, via the encrusted beads, into the bullet to thereby flatten it and further reduce its speed. After rebounding from the first layer beads embedded in the bullet, the twelve beads fo the second layer make a second collision with the flexible inner layer 14 and another cycle of the above described behaviour is repeated. Thus, the primary motion of the affected beads 22 of the inner layer 16, after the first impact, is seen to be a high frequency series of energy dissipative collisions transferring energy from the bullet to the inner flexible layer 14 and to other beads in the lattice pattern of the inner layer as collisions become more disordered. Some motion in the inner layer of beads is initiated in that plane by the first compression wave in the twelve beads, and a lateral component results in a stress being transmitted through both layers of beads. Until the twelve beads $22_1$–$22_{12}$ move out off the lattice pattern, the neighbouring beads in the inner layer 16 are restrained to vibratory motion only, but some of the beads in the outer layer 15 may be ejected from their positions in the lattice pattern. When the twelve beads commence movement out of their lattice pattern, motion of the surrounding beads becomes more random.

When the embodiment shown in FIG. 6 is used, i.e., the beads in the inner layer are separated from the beads in the outer layer by a thin cloth, the presence of the cloth interface appears to be a primary factor in causing a change in action of the beads from that described above. On impact of the bullet with the outer layer, the presence of the cloth reduces the compressive stress transmitted into the beads of the inner layer, it being estimated that a KEVLAR cloth could provide a reduction factor of about 4. This reduces the likelihood of spalling of the inner beads and weakens the strength of the tensile wave reflected back towards the bullet from the impact of beads $22_1$–$22_{12}$ with the inner flexible layer 14. In addition, the energy dissipation in stretching the cloth 26 wedged between the two layers 15 and 16 could be considerable. It would appear, however, that at least partially opposing these advantages is the fact that the presence of the cloth results in reduction of the off-set impact angle between the beads of the two layers. Also, the reduction in stress transmitted to the beads $22_1$–$22_{12}$ implies a slower rebound of these beads from the flexible inner layer 14. This, in turn, would mean a reduction in the stress wave transmitted into the bullet from the active beads after every rebound so that less energy is dissipated in distorting the bullet. On the other hand, the presence of the cloth tends to restrain disorder of the beads in both layers so that divergence of beads from the primary zone involving impact after rebound is inhibited. In conclusion, this embodiment appears competitive for soft bullets, but possibly less desirable for hard bullets.

If the structure of the present invention is used with a rigid backing in place of the flexible inner layer 14 or so close to the inner layer that the inner layer is not flexible, rupture of the backing can only be prevented by a prohibitively thick backing. All of the energy-dissipative bead motion described in regard to events following the first rebound of beads from the flexible inner layer do not apply.

If the structure of the present invention is modified to present a design more similar to that suggested by the prior, i.e., to have the bead lattice pattern of the two layers immersed in a liquid resin which is left to harden so that every bead is surrounded by a low density plastic, the behaviour of the first compression wave through the two layers of beads to the inner layer 14 would be the same as described above. However, the rotation, vibration and subsequent bead collision, which provide the energy-dissipative mechanisms, are severely inhibited. The bead-rebound feature of the present invention is replaced by a large scale spall of the low tensile resistant resin material when the slower moving compression wave travelling through the resin is reflected back as a tensile wave from the inner layer 14.

The embodiment shown in FIG. 1 has undergone numerous tests, and in those which will be described below, both layers of beads were 3 mm. soda lime glass beads. Bullets were fired from a 357 Browning rifle with a 20 inch (0.508 m.) length barrel. All bullets were fired at the same range, about 4 m., in a firing tunnel built specially for the test. Most tests were carried out with a 0.38" (9.65 mm.) diameter "semi-wad cutter" bullet delivering a 158 grain (10.26 g.) slug at a mean calibrated velocity of 357 m/s. A slower bullet of the same diameter, same type and same slug weight, calibrated at 300 m/s, was used at an early stage, while a 0.357" (9.07 mm.) diameter bullet delivering a "jacketed soft point" (JSP) slug of the same weight at a calibrated velocity of 402 m/s was used at a later stage. Tests with the 357 m/s bullet and the 402 m/s bullet dominated the bullet testing leading to the particular design which is illustrated and which is one capable of meeting a large-calibre magnum handgun bullet threat.

Tests were also conducted using a 38 calibre bullet delivering a 158 grain JSP slug at a calibrated velocity of 564 m/s against an arrangement having two of the components 11 and with the same inner component 12 in order to obtain some assessment of the problems involved in dealing with high velocity bullets. The illustrated design was also tested using 22 calibre bullets (5.59 mm. dia.) delivering a 40 grain slug at 380 m/s and a 32 grain slug at 488 m/s in order to obtain evidence in relation to the possibility that these low calibre slugs might be more penetrating than those of larger diameter.

In the testing, the components were located immediately in front of a 38 mm. thick, fir wood block, and the main post-firing observations included the volume and depth of the cavity formed in the block, the diameter and penetration level of the trapped slug, and the immediate post-firing temperature of the slug which was measured by a thermocouple. It is believed that the volume ($V_c$) of the cavity in the wood is the most important simple indicator of the body-armour performance. It is related to the kinetic energy ($E_c$) transferred to the wood which simulates the body of the wearer, of course, after all the body-armour dissipative means have been exhausted. For the fir batch used in the experiments, this residual, or cavity forming energy, was obtained from the relation:

$$E_c(\text{Joules}) = 24.9 \{V_c(ml)\}^{0.778}$$

This was determined using a least square fit to calibration cavity data obtained with a pendulum-supported impactor. In view of the strong effect of armour mass on the energy available for cavity formation, a measure of armour effectiveness which is free from this complication is desirable. One such measure is the apparent dissipated energy ($E_i - E_c$), where $E_i$ is the residual energy after a hypothetical unrestrained inelastic collision of the bullet with the armour. This was used as a practical index of the relative effectiveness of a candidate armour for the purposes of design.

The embodiment of the invention illustrated herein using 3 mm. soda lime glass beads, when mounted so as to simulate a full body armour garment, resisted a 357 m/s, 10.26 g, 38 calibre SWC slug to the extent that, in a typical test, the fir wood immediately behind the armour registered a barely perceptible bruise (about 0.5 mm. in depth and 0.01 ml. in volume), representing a residual impact energy of about 0.8 Joules, while its resistance to a 402 m/s, 10.26 g, 357 cal JSP slug was such that the fir wood immediately behind the armour registered a shallow bruise (about 1 mm. in depth and 0.43 ml. in volume), representing a residual impact energy of about 13 Joules. Resistance to the 22 calibre bullets was such that no bruise could be detected. The mass of armour involved per unit area was 1.15 g/cm² for the outer component and 1.06 g/cm² for the inner component, i.e., a total of 2.21 g/cm² (4.51 lb./ft²).

Tests were also carried out in order to assess the condition of the flexible inner layer 14 of the outer or bullet trapping component 11 before its impact with the inner component 12 of the body armour. The outer component was secured lightly without any inner component, and instead the outer component was brought to rest by a light bag filled with shaving foam to a thickness of about 30 cm. This arrangement ensured negligible distortion other than that resulting from the bullet impact. The slug was found to be fully contained within the inner flexible layer 14 in all cases. It is believed that these tests verify the bead action previously described.

To be able to compare the test results of the present invention with the two alternatives described above, other samples of armour were made for testing with the invention. More specifically, the invention was tested using 3 mm. soda lime glass spheres for both layers of beads in the outer component and the test results of this sample are shown under A below. The same outer component was also tested but using the single layer of cloth, and in this case KEVLAR was used, between the two layers of beads. The results of this sample are shown under D below. The same type of outer component (A) was used but with a rigid aluminum plate backing (0.79 mm. thick), and the results obtained here are given under B below. A fourth sample had the same bead structure as (A) except that the beads were immersed in a resin, and the results for this sample are given under C below. In all samples the component was 5 cm. × 5 cm. (nominal) and the backing was 14 layers of KEVLAR cloth 14 cm. × 14 cm. in area supported on a 38 mm. thick fir wood. The bullet tests used 357 m/s, 10.26 g slug, 38 cal bullet against each of the components identified as A (the present invention), B (same component as A but with rigid backing), C (beads surrounded in plastic), D (the present invention and including cloth layer between layers of beads).

| TYPE OF OUTER COMPONENT (BULLET TRAP) | | | | |
| --- | --- | --- | --- | --- |
|  | A | B | C | D |
| Dissipated energy ($E_i - E_c$) - Joules | 33 (32) | 10 | 15 | 39 (36) |
| Increase in slug front temperature - degrees - C. | 60 (48*) | 60 | 52 | 61 (52*) |
| Bullet contained in | Yes | No | No | Yes |

-continued

| TYPE OF OUTER COMPONENT (BULLET TRAP) | | | |
|---|---|---|---|
| A | B | C | D |
| trap after total impact? | | | |

*Indicates temperature at rear of slug ( ) Indicates a repeat comparison

The high slug temperature for sample B is believed due to the deformation of the bullet during exit from the inner layer of the component. Nevertheless, the tests illustrated the superior function of the present invention in containing the bullet and while dissipating the energy.

Various modifications to the illustrated embodiments of the invention will be apparent to those skilled in the art without departing from the spirit of the invention as defined in the accompanying claims.

What I claim is:

1. An armour component comprising:
   inner and outer layers of flexible material,
   at least the inner layer of flexible material being of high impact-resistant material,
   at least two juxtaposed internested layers of hard beads confined between said two layers of flexible material,
   the beads in one layer of hard beads being disposed in most compact relation with the beads of an adjacent layer of hard beads whereby the beads of the adjacent layers of hard beads internest in the inter-bead spaces of each other, said hard beads being substantially free to rotate and to vibrate during collision of a bullet with said armour component so that said beads of said layers of hard beads encounter repeated impact with each other and said bullet to thereby provide an action causing distortion of said bullet and dissipation of bullet energy, and
   stitching means passing through said layers of flexible material and the beads in the layers of hard beads therebetween for drawing the layers of flexible material toward one and other and thereby holding said beads tightly in said relation,
   the volume occupied by the layers of beads being substantially void of all other material.

2. An armour component for use against a bullet, said component comprising:
   at least two pairs of layers of flexible material,
   at least two layers of hard beads tightly confined one each between one of said pair of layers of flexible material.
   the beads in each layer of hard beads being thereby contained in a separate flat envelope formed by said one pair of layers of flexible material,
   the layers of beads in the envelopes being void of any inter-bead matrix and being held in like close packed lattice patterns by means drawing together said pair of layers of flexible material forming each envelope,
   said hard beads on impact of a bullet being free to rotate and vibrate so as to encounter repeated impacts with each other and said bullet to thereby provide an action causing dissipation of bullet energy,
   said envelopes being fastened together with juxtaposed layers of flexible material of the separate envelopes held in face-to-face engaging relationship and the beads of the two layers internesting in the inter-bead spaces of each other.

3. An armour component as defined in claim 2, wherein said means drawing together said pair of layers of flexible material forming each envelope includes a thread sewn between the pair of layers of flexible material and passing between the inter-bead spaces in the layer of beads in the envelope.

4. An armour component as defined in claim 3, wherein said thread is normal to said layers of flexible material of the envelope.

5. An armour component as defined in claim 2, wherein the layer of flexible material forming an innermost layer of said component being of high impact-resistant material.

6. An armour component as defined in claim 2, wherein said envelopes forming said component are preformed as separate parts and then said parts are sewn together.

7. An armour component as defined in claim 6, wherein the sewing of each envelope tightly crimps the pair of layers of flexible material of said envelope into the inter-bead spaces of the layer of hard beads confined between said pair of layers of flexible material.

8. An armour component as defined in claim 2, wherein said envelopes have means fastening one to the other in the form of stitching passing through the pairs of layers of flexible material forming said envelopes and between aligned inter-bead spaces of the layers of beads confined between said pairs of layers of flexible material.

* * * * *